US010112530B1

(12) United States Patent
Snyder et al.

(10) Patent No.: US 10,112,530 B1
(45) Date of Patent: *Oct. 30, 2018

(54) SYSTEM AND METHODS FOR DETECTING VEHICLE BRAKING EVENTS USING DATA FROM FUSED SENSORS IN MOBILE DEVICES

(71) Applicant: Allstate Insurance Company, Northbrook, IL (US)

(72) Inventors: Jared S. Snyder, Chicago, IL (US); Dana Ferguson, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,889

(22) Filed: Sep. 20, 2017

Related U.S. Application Data

(63) Continuation of application No. 15/391,986, filed on Dec. 28, 2016, now Pat. No. 9,809,159.

(51) Int. Cl.
*B60Q 1/52* (2006.01)
*B60Q 1/44* (2006.01)
(Continued)

(52) U.S. Cl.
CPC ............... *B60Q 1/525* (2013.01); *B60Q 1/44* (2013.01); *B60T 17/22* (2013.01); *G06N 99/005* (2013.01); *G06Q 40/08* (2013.01)

(58) Field of Classification Search
CPC ........... B60Q 1/525; B60Q 1/44; B60T 17/22; G06N 99/005; G06Q 40/08
(Continued)

(56) References Cited

U.S. PATENT DOCUMENTS 8,423,255 B2 4/2013 Padmanabhan et al.
8,876,535 B2 11/2014 Fields et al.
(Continued)

FOREIGN PATENT DOCUMENTS

WO 2013155437 A1 10/2013
WO 2015049539 A1 4/2015

OTHER PUBLICATIONS

Ellis, Katherine et al., "Identifying Active Travel Behaviors in Challenging Environments Using GPS, Accelerometers, and Machine Learning Algorithms", Frontiers in Public Health, Apr. 22, 2014, vol. 2:36, 8 pp., doi:10.3389/fpubh.2014.00036.
(Continued)

*Primary Examiner* — Hirdepal Singh
(74) *Attorney, Agent, or Firm* — Banner & Witcoff, Ltd.

(57) ABSTRACT

One or more braking event detection computing devices and methods are disclosed herein based on fused sensor data collected during a window of time from various sensors of a mobile device found within an interior of a vehicle. The various sensors of the mobile device may include a GPS receiver, an accelerometer, a gyroscope, a microphone, a camera, and a magnetometer. Data from vehicle sensors and other external systems may also be used. The braking event detection computing devices may adjust the polling frequency of the GPS receiver of the mobile device to capture non-consecutive data points based on the speed of the vehicle, the battery status of the mobile device, traffic-related information, and weather-related information. The braking event detection computing devices may use classification machine learning algorithms on the fused sensor data to determine whether or not to classify a window of time as a braking event.

20 Claims, 8 Drawing Sheets

(51) Int. Cl.
    *G06N 99/00*     (2010.01)
    *G06Q 40/08*     (2012.01)
    *B60T 17/22*     (2006.01)

(58) Field of Classification Search
    USPC .................................................... 340/903
    See application file for complete search history.

(56) References Cited

U.S. PATENT DOCUMENTS

| | | | |
|---|---|---|---|
| 8,930,231 B2 | 1/2015 | Bowne et al. | |
| 9,217,757 B2 | 12/2015 | Hergesheimer et al. | |
| 9,679,487 B1 | 6/2017 | Hayward | |
| 9,870,649 B1 * | 1/2018 | Fields | G07C 5/008 |
| 9,919,607 B2 * | 3/2018 | Ponziani | B60L 7/26 |
| 2007/0252723 A1 | 11/2007 | Boss et al. | |
| 2010/0318257 A1 | 12/2010 | Kalinadhabhotla | |
| 2011/0307188 A1 | 12/2011 | Peng et al. | |
| 2012/0185125 A1 * | 7/2012 | Kitagawa | G07C 5/085 701/32.7 |
| 2013/0166099 A1 | 6/2013 | Van den Bergh | |
| 2013/0211618 A1 | 8/2013 | Iachini | |
| 2013/0302758 A1 * | 11/2013 | Wright | G07C 5/008 434/65 |
| 2013/0316310 A1 | 11/2013 | Musicant et al. | |
| 2014/0095305 A1 | 4/2014 | Armitage et al. | |
| 2014/0149145 A1 | 5/2014 | Peng et al. | |
| 2014/0370919 A1 | 12/2014 | Cordova et al. | |
| 2015/0198722 A1 | 7/2015 | Ben-Akiva et al. | |
| 2016/0016590 A1 * | 1/2016 | Fernandez Pozo | B60W 40/10 702/141 |
| 2016/0042644 A1 | 2/2016 | Velusamy | |
| 2016/0139598 A1 | 5/2016 | Ichikawa et al. | |
| 2016/0200253 A1 | 7/2016 | Braunberger et al. | |
| 2017/0061812 A1 | 3/2017 | Lahav et al. | |
| 2017/0072850 A1 | 3/2017 | Curtis et al. | |
| 2017/0091872 A1 * | 3/2017 | Okumura | G06Q 40/08 |
| 2017/0105098 A1 | 4/2017 | Cordova et al. | |
| 2017/0132931 A1 | 5/2017 | Hoffberg | |
| 2017/0132951 A1 * | 5/2017 | Fields | G09B 19/167 |
| 2017/0146563 A1 | 5/2017 | Braunberger | |
| 2017/0345229 A1 * | 11/2017 | Huang | G07C 5/008 |
| 2017/0349182 A1 * | 12/2017 | Cordova | B60W 40/09 |

OTHER PUBLICATIONS

Liu, Ming, "A Study of Mobile Sensing Using Smartphones", International Journal of Distributed Sensor Networks, vol. 2013, Article ID 272916, 11pp., URL: http://dx.doi.org/10.1155/2013/272916.

* cited by examiner

SYSTEM AND METHODS FOR DETECTING VEHICLE BRAKING EVENTS USING DATA FROM FUSED SENSORS IN MOBILE DEVICES

RELATED APPLICATION

The present application is a continuation of and claims priority to co-pending U.S. patent application Ser. No. 15/391,986, filed Dec. 28, 2016, and entitled "System and Methods for Detecting Vehicle Braking Events Using Data From Fused Sensors in Mobile Devices." The entire disclosure of the aforementioned priority application is hereby incorporated by reference.

TECHNICAL FIELD

Aspects of the disclosure generally relate to the analysis of sensor data obtained from a mobile device within an interior of a vehicle. In particular, various aspects of the disclosure relate to receiving and transmitting sensor data, and analyzing the data using classification machine learning algorithms to detect braking events.

BACKGROUND

Insurance companies value the safety of drivers and the general public. Detecting likely braking events in a particular vehicle and issuing notifications to nearby vehicles promotes safety. Although techniques exist to generally capture data from sensors on smartphones and in vehicles, they might not provide power-efficient methods of doing so. Further, these techniques may not notify nearby drivers of likely braking events.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Advantageous solutions to the problems presented above, and other issues which will be apparent upon the reading of the present disclosure, may be to collect sensor data from sensors associated with a mobile device within a vehicle during a window of time using a polling frequency. In some examples, the sensor data may be raw sensor data. The sensors may comprise a GPS receiver, an accelerometer, a gyroscope, and the like. Accordingly, the raw sensor data may be processed to determine information relating to a location, a speed, and an acceleration of the vehicle. The polling frequency may be determined based on the speed of the vehicle, a battery status of the mobile device, traffic information within a first threshold radius of the vehicle, and weather information within a second threshold radius of the vehicle.

In accordance with further aspects of the present disclosure, a method disclosed herein may include collecting raw sensor data from sensors associated with a mobile device within a vehicle during a window of time using a polling frequency. The sensors may comprise a GPS receiver, an accelerometer, and a gyroscope. Accordingly, the raw sensor data may be processed to determine information relating to a location, a speed, and an acceleration of the vehicle. The polling frequency may be determined based on the speed of the vehicle, a battery status of the mobile device, traffic information within a first threshold radius of the vehicle, and weather information within the second threshold radius of the vehicle.

In accordance with further aspects of the present disclosure, a computer-assisted method of detecting braking events disclosed herein may include collecting raw sensor data from sensors associated with a mobile device within a vehicle during a window of time using a polling frequency. The sensors may comprise a GPS receiver, an accelerometer, and a gyroscope. Accordingly, the raw sensor data may be processed to determine information relating to a location, a speed, and an acceleration of the vehicle. The polling frequency may be determined based, at least in part, on the speed of the vehicle, a battery status of the mobile device, traffic information within a first threshold of the vehicle, and weather information within a second threshold radius of the vehicle, where the first threshold radius is smaller than the second threshold radius.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a specially-programmed computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
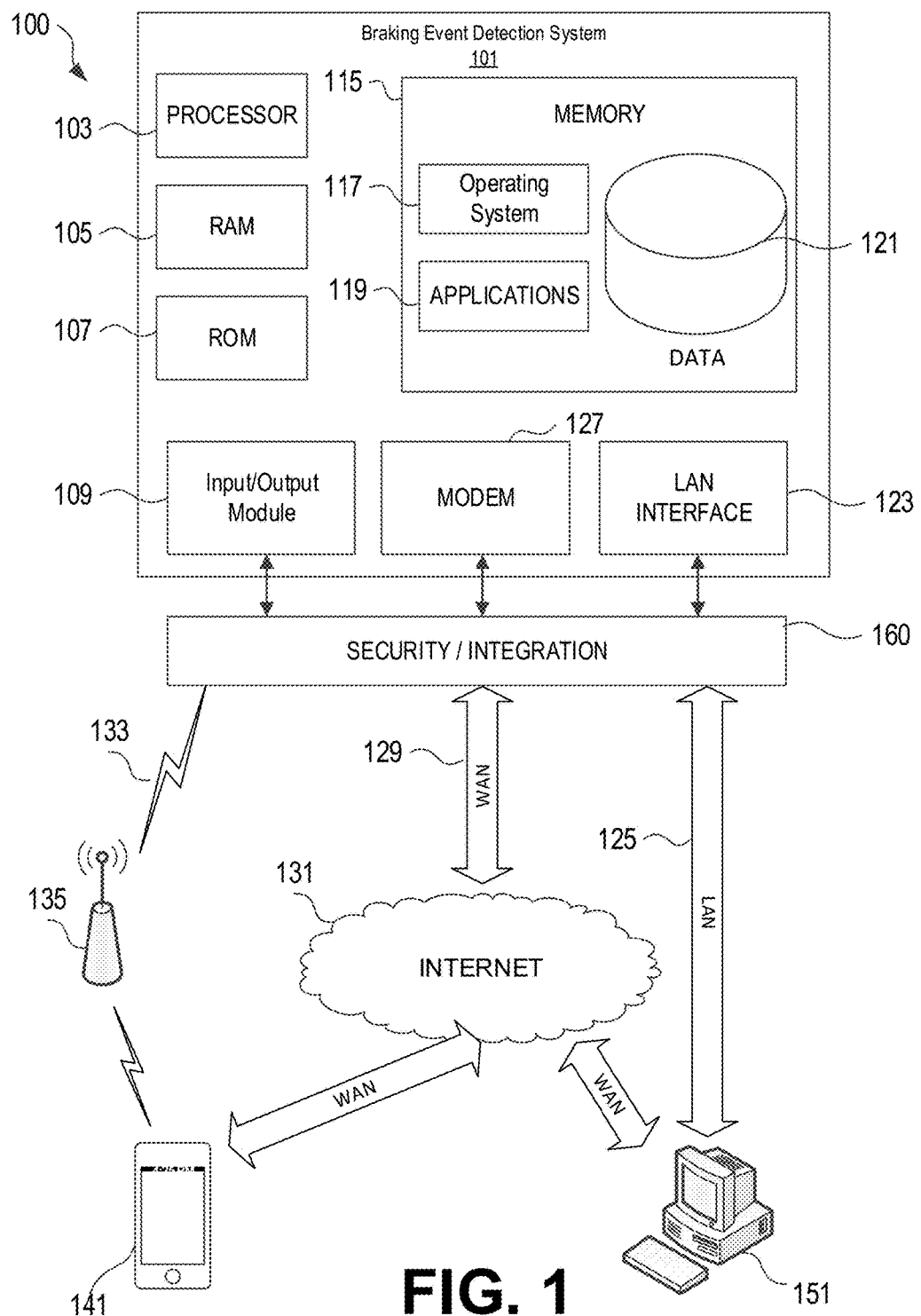
FIG. 1 illustrates a network environment and computing systems that may be used to implement aspects of the disclosure.

FIG. 1 illustrates a block diagram of a braking event detection system 101 in a fused sensor data analysis system 100 that may be used according to one or more illustrative embodiments of the disclosure. The braking event detection system 101 may have a processor 103 for controlling overall operation of the braking event detection system 101 and its associated components, including RAM 105, ROM 107, input/output module 109, and memory 115. The braking event detection system 101, along with one or more additional devices (e.g., terminals 141, 151) may correspond to one or more special-purpose computing devices, such as fused sensor data analysis computing devices or systems, including mobile computing devices (e.g., smartphones, smart terminals, tablets, and the like) and vehicular-based computing devices, configured as described herein for collecting and analyzing fused sensor data from mobile devices associated with vehicles, detecting braking events, and issuing notifications regarding the braking events.

Input/Output (I/O) 109 may include a microphone, keypad, touch screen, and/or stylus through which a user of the braking event detection system 101 may provide input, and may also include one or more of a speaker for providing audio output and a video display device for providing textual, audiovisual and/or graphical output. Software may be stored within memory 115 and/or storage to provide instructions to processor 103 for enabling the braking event detection system 101 to perform various functions. For example, memory 115 may store software used by the braking event detection system 101, such as an operating system 117, application programs 119, and an associated internal database 121. Processor 103 and its associated components may allow the braking event detection system 101 to execute a series of computer-readable instructions to transmit or receive fused sensor data, analyze fused sensor data, detect braking events, and issue notifications The braking event detection system 101 may operate in a networked environment supporting connections to one or more remote computers, such as terminals/devices 141 and 151. The braking event detection system 101, and related terminals/devices 141 and 151, may be in signal communication with special-purpose devices installed in vehicles, mobile devices that may travel within vehicles, or devices outside of vehicles that are configured to receive and process fused sensor data. Thus, the braking event detection system 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the braking event detection system 101.

The network connections depicted in FIG. 1 include a local area network (LAN) 125 and a wide area network (WAN) 129, and a wireless telecommunications network 133, but may also include other networks. When used in a LAN networking environment, the braking event detection system 101 may be connected to the LAN 125 through a network interface or adapter 123. When used in a WAN networking environment, the braking event detection system 101 may include a modem 127 or other means for establishing communications over the WAN 129, such as network 131 (e.g., the Internet). When used in a wireless telecommunications network 133, the braking event detection system 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and mobile device location and configuration system components described herein may be configured to communicate using any of these network protocols or technologies.

Also illustrated in FIG. 1 is a security and integration layer 160, through which communications may be sent and managed between the braking event detection system 101 (e.g., a user's personal mobile device, a vehicle-based system, external server, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the braking event detection system 101. As an example, a security and integration layer 160 of a mobile computing device, vehicle-based device, or a server operated by an insurance provider, financial institution, governmental entity, or other organization, may comprise a set of web application servers configured to use secure protocols and to insulate the braking event detection system 101 from external devices 141 and 151. In some cases, the security and integration layer 160 may correspond to a set of dedicated hardware and/or software operating at the same physical location and under the control of same entities as the braking event detection system 101. For example, layer 160 may correspond to one or more dedicated web servers and network hardware in an organizational datacenter or in a cloud infrastructure supporting a cloud-based mobile device location and configuration system. In other examples, the security and integration layer 160 may correspond to separate hardware and software components which may be operated at a separate physical location and/or by a separate entity.

As discussed below, the data transferred to and from various devices in fused sensor data analysis system 100 may include secure and sensitive data, such as driving data, driving locations, vehicle data, and confidential individual data such as insurance data associated with vehicle occupants. In at least some examples, transmission of the data may be performed based on one or more user permissions provided. Therefore, it may be desirable to protect transmissions of such data by using secure network protocols and encryption, and also to protect the integrity of the data when stored on in a database or other storage in a mobile device, analysis server, or other computing devices in the fused sensor data analysis system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in the fused sensor data analysis system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption.

In other examples, one or more web services may be implemented within the braking event detection system 101 in the fused sensor data analysis system 100 and/or the security and integration layer 160. The web services may be accessed by authorized external devices and users to support input, extraction, and manipulation of the data (e.g., driving data, location data, confidential personal data, etc.) between the braking event detection system 101 in the fused sensor data analysis system 100. Web services built to support the fused sensor data analysis system 100 may be cross-domain and/or cross-platform, and may be built for enterprise use. Such web services may be developed in accordance with various web service standards, such as the Web Service Interoperability (WS-I) guidelines. In some examples, a movement data and/or driving data web service may be implemented in the security and integration layer 160 using the Secure Sockets Layer (SSL) or Transport Layer Security (TLS) protocol to provide secure connections between servers (e.g., braking event detection devices 101) and various clients 141 and 151 (e.g., mobile devices, data analysis servers, etc.). SSL or TLS may use HTTP or HTTPS to provide authentication and confidentiality.

In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in the fused sensor data analysis system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a driving database, a vehicle database, insurance customer database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of retrieving and analyzing fused sensor data, such as faster response times and less dependence on network conditions when transmitting/receiving fused sensor data, vehicle data, occupant data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the braking event detection system 101 within the fused sensor data analysis system 100 (e.g., braking event detection software applications, and the like), including computer executable instructions for receiving and storing data from fused sensors of mobile devices, and/or vehicle-based systems, analyzing the fused sensor data to determine whether there is a braking event, issuing notifications regarding the braking event, and/or performing other related functions as described herein.

Figure 2:
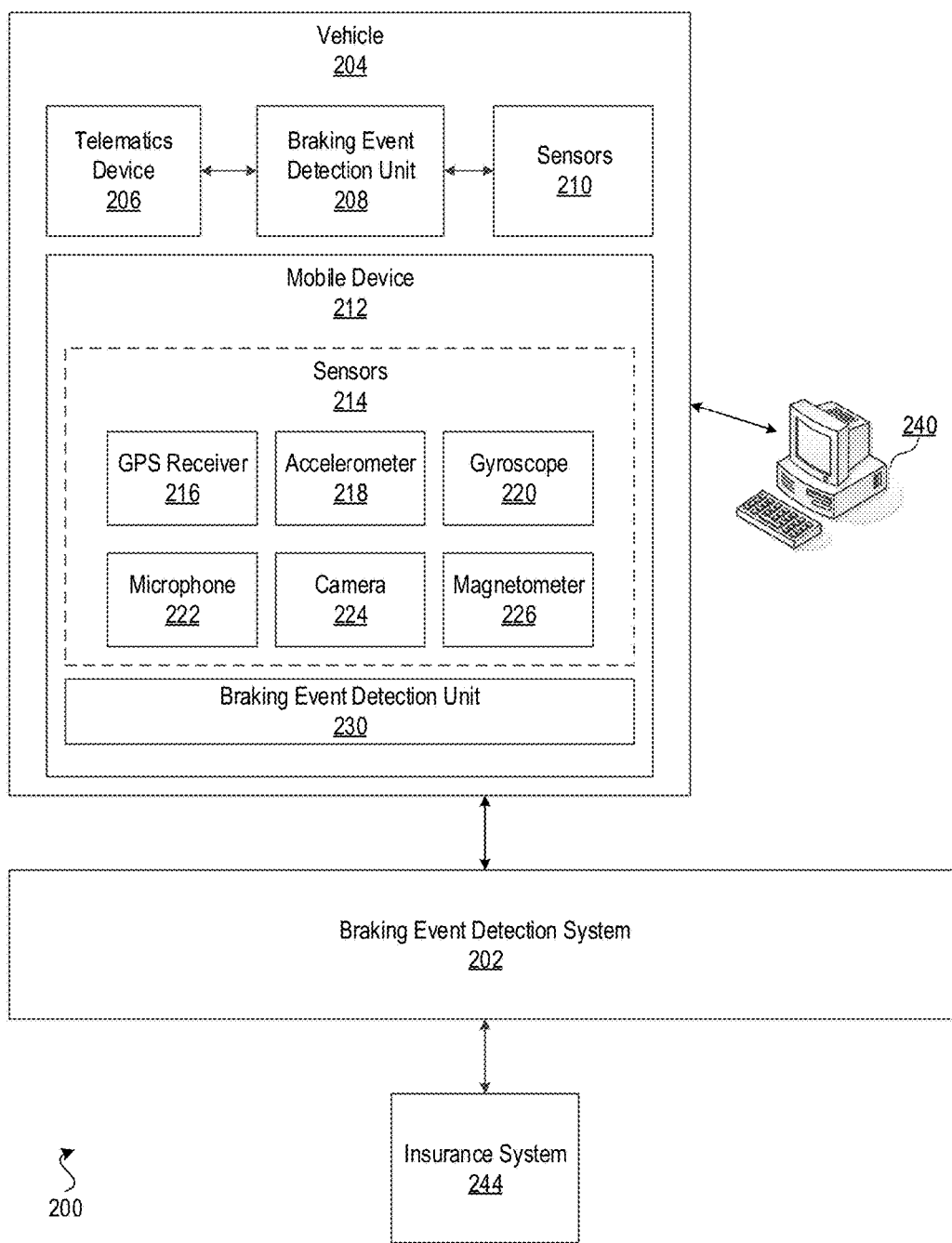
FIG. 2 is a block diagram illustrating various components and devices associated with an example fused sensor data analysis system, according to one or more aspects of the disclosure.

FIG. 2 is an illustration of an example implementation of a fused sensor data analysis system 200. The fused sensor data analysis system 200 may be similar to and/or may include some or all of the components of the fused sensor data analysis system 100 in FIG. 1. The system 200, in this example, includes a braking event detection system 202. The system 200, in this example, includes a braking event detection system 202. The braking event detection system 202, described in further detail below, detects braking events for a vehicle. The braking event detection system 202 may be similar to and/or may include some or all of the components of the braking event detection system 101 in FIG. 1. In some examples, the braking event detection system 202 may detect a braking event based on fused sensor data received from one or more mobile devices associated with the vehicle. Fused sensor data may include raw sensor data received from one or more sensors of a mobile device 212 and/or a vehicle 204, derived sensor data (e.g., outputs from statistical computations on raw sensor data), and/or processed data (e.g., outputs from smoothing algorithms applied on the raw sensor data and/or the derived data). In some examples, fused sensor data may include an aggregation of raw sensor data received from one or more sensors of a mobile device 212 and/or a vehicle 204, derived sensor data (e.g., outputs from statistical computations on the raw data), and processed data (e.g., outputs from smoothing algorithms applied on the raw data and/or the derived data) associated with operation of a vehicle with respect to, e.g., accelerating, decelerating, braking, turning, signaling, lane usage, adequate vehicle spacing, speed, distraction management, and other driving-related operations performed by a driver of the vehicle as captured by sensors of, for example, a mobile device (e.g., a mobile device on board or associated with the vehicle). Collectively, this data may be referred to as fused sensor data. In some arrangements, the mobile device may be in signal communication with the vehicle or various systems or components of the vehicle, the braking event detection system 202, and one or more external systems (e.g., an insurance system 244).

The example fused sensor data analysis system 200 may contain some or all of the hardware/software components as the fused sensor data analysis system 100 depicted in FIG. 1. The braking event detection system 202 is a special-purpose computing device that is configured to receive fused sensor data (e.g., raw sensor data, signals and the like) from a mobile device 212 located within a vehicle 204. The braking event detection system 202 may initiate communication with, retrieve data from, or receive raw fused sensor data (e.g., signals) from one or more sensors within a mobile device 212 wirelessly over one or more computer networks (e.g., the Internet), where the mobile device 212 is located within a vehicle 204. The braking event detection system 202 may also be configured to receive driving data from a vehicle 204 wirelessly via telematics devices 206, or by way of separate computing systems (e.g., computer 240) over one or more computer networks (e.g., the Internet). Further, the braking event detection system 202 may be configured to receive driving vehicle-related data from one or more third-party telematics systems or non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet and hail amounts, temperatures, wind, road conditions, visibility, etc.) at various times and locations, and other external data sources containing driving hazard data (e.g., road hazards, traffic accidents, downed trees, power outages, construction zones, school zones, and natural disasters, etc.).

A mobile device 212 in the fused sensor data analysis system 200 may be, for example, any mobile device, such as a smartphone, tablet computing device, personal digital assistant (PDA), smart watch, netbook, laptop computer, and other like devices found within a vehicle 204. As used herein, a mobile device 212 "within" the vehicle 204 includes mobile devices that are inside of or otherwise secured to a vehicle, for instance, in the cabins of a vehicle. The mobile device 212 includes a set of mobile device sensors 214, which may include, for example, a GPS receiver 216, an accelerometer 218, a gyroscope 220, a microphone 222, a camera 224, and a magnetometer 226. The mobile device sensors 214 may be capable of detecting and recording various conditions at the mobile device 112 and operational parameters of the mobile device 112. For example, sensors 214 may detect and store data corresponding to the mobile device's location (e.g., GPS coordinates), speed and direction in one or multiple axes (forward and back, left and right, and up and down for example), rates of acceleration or deceleration, specific instances of sudden acceleration, deceleration, and lateral movement, and other data which may be indicative of a vehicle braking event. Additional sensors 214 may include audio sensors, video sensors, signal strength sensors, communication network-presence sensors, ambient light sensors, temperature/humidity sensors, and/or barometer sensors, which may be used to, for example, listen to audio signals indicating a door locking/unlocking, door chime, or vehicle ignition, sensing light from an overhead or dashboard light, detecting a temperature or humidity change indicative of entering a vehicle, and/or detecting a presence of a network or communication device associated with a vehicle (e.g., a BLUETOOTH transceiver associated with a vehicle).

Software applications executing on mobile device 212 may be configured to detect certain driving data independently using mobile device sensors 214. For example, mobile device 212 may be equipped with sensors 214, such as a GPS receiver 216, an accelerometer 218, a gyroscope 220, a microphone 222, a camera 224, and/or a magnetometer 226, and may determine vehicle location, speed, acceleration/deceleration, direction and other basic driving data without needing to communicate with the vehicle sensors 210, or any vehicle system. In other examples, software on the mobile device 212 may be configured to receive some or all of the driving data collected by vehicle sensors 210.

Additional sensors 214 may detect and store external conditions. For example, audio sensors and proximity sensors 214 may detect other nearby mobile devices, traffic levels, road conditions, traffic obstructions, animals, cyclists, pedestrians, and other conditions that may factor into a braking event data analysis.

Data (e.g., raw data or signal) collected by the mobile device sensors 214 may be stored, processed, and/or analyzed within the mobile device 212, and/or may be transmitted to one or more external devices for processing, analysis, and the like. For example, as shown in FIG. 2, raw sensor data, signals, etc. collected by the mobile device sensors 214 may be transmitted to a braking event detection system 202. In some examples, the data collected by the mobile device sensors 214 may be stored, processed, and/or analyzed at the vehicle 204 by an on-board computing device in the vehicle or by the mobile device 212, and/or may be transmitted to one or more external devices (e.g., an insurance system 240). For example, sensor data may be exchanged (uni-directionally or bi-directionally) between vehicle 204 and mobile device 212.

Data may be transmitted between the mobile device 212 and the vehicle 204 via wireless networks, including those discussed above, or short-range communication systems. Short-range communication systems are data transmission systems configured to transmit and receive data between nearby devices. In this example, short-range communication systems may be used to transmit sensor data to other nearby mobile devices and/or vehicles, and to receive sensor data from other nearby mobile devices and/or vehicles. Short-range communication systems may be implemented using short-range wireless protocols such as WLAN communication protocols (e.g., IEEE 802.11), Bluetooth (e.g., IEEE 802.15.1), or one or more of the Communication Access for Land Mobiles (CALM) wireless communication protocols and air interfaces. The transmissions between the short-range communication systems may be sent via Bluetooth, satellite, GSM infrared, IEEE 802.11, WiMAX, RFID, and/or any suitable wireless communication media, standards, and protocols. In certain systems, short-range communication systems may include specialized hardware installed in vehicle 204 and/or mobile device 212 (e.g., transceivers, antennas, etc.), while in other examples the communication systems may be implemented using existing hardware components (e.g., radio and satellite equipment, navigation computers) or may be implemented by software running on the mobile device 212 and/or on an on-board computing device within the vehicle 204.

The vehicle 204 may be, for example, an automobile, motorcycle, scooter, bus, recreational vehicle, boat, bicycle, or other vehicle for which braking events may be detected. The vehicle 204 may include one or more sensors 210, which are capable of detecting and recording various conditions at the vehicle and operating parameters of the vehicle. For example, the sensors 210 may detect, transmit, or store data corresponding to the vehicle's location (e.g., GPS coordinates), speed and direction, rates of acceleration, deceleration, and/or may detect transmit specific instances of sudden acceleration, sudden deceleration, and swerving. The sensors 210 may also detect, transmit, or store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems. Thus, in some examples, the braking event detection system 202 may acquire information about the vehicle 204 directly from the vehicle 204.

Additional sensors 210 may detect and store the external driving conditions, for example, external temperature, rain, snow, light levels, and sun position for driver visibility. Additional sensors 210 may also detect and store data relating to compliance with traffic laws and the observance of traffic signals and signs. Additional sensors 210 may further detect and store data relating to the maintenance of the vehicle 204, such as the engine status, oil level, engine coolant temperature, odometer reading, the level of fuel in the fuel tank, engine revolutions per minute (RPMs), tire pressure, or combinations thereof.

The vehicle 204 may also include cameras or proximity sensors 210 capable of recording additional conditions inside or outside of the vehicle 204. For example, internal cameras 210 may detect conditions such as the number of passengers and the types of passengers (e.g., adults, children, teenagers, handicapped, etc.) in the vehicles, and potential sources of driver distraction within the vehicle (e.g., pets, phone usage, unsecured objects in the vehicle). Sensors 210 also may be configured to collect data a driver's movements or the condition of a driver. For example, the vehicle 204 may include sensors 210 that monitor a driver's movements, such as the driver's eye position and/or head position, etc. Additional sensors 210 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer. Further, the vehicle 204 may include sensors 210 that capable of detecting other nearby vehicles, traffic levels, road conditions, traffic obstructions, animals, cyclists, pedestrians, and other conditions that may factor into an analysis of vehicle telematics data. Certain vehicle sensors 210 also may collect information regarding the driver's route choice, whether the driver follows a given route, and to classify the type of trip (e.g., commute, errand, new route, etc.). A Global Positioning System (GPS), locational sensors positioned inside the vehicle 214, and/or locational sensors or devices external to the vehicle 214 may be used determine the route, trip type (e.g., commute, errand, new route, etc.), lane position, and other vehicle position or location data.

The data collected by the vehicle sensors 210 may be stored or analyzed within the respective vehicle 204 by an on-board computing device or mobile device 212, or may be transmitted to one or more external devices. For example, as shown in FIG. 2, raw sensor data may be transmitted to a braking event detection system 202, which may be a collection of special-purpose computing devices that are interconnected and in signal communication with each other. The special-purpose computing devices may be programmed with a particular set of instructions that, when executed, perform functions associated processing the raw sensor data to detect braking events and generate and/or issue notifications to other vehicles regarding the braking events. As such, a braking event detection system 202 may be a separate special-purpose computing device or may be integrated into one or more components within the vehicle 204, such as the telematics device 206, or in the internal computing systems (e.g., on-board vehicle computing device) of the vehicle 204. Additionally, the sensor data may be transmitted as vehicle telematics data via a telematics device 206 to one or more remote computing devices, such as a braking event detection system 202. A telematics device 206 may be a computing device containing many or all of the hardware/software components as the braking event detection system 101 depicted in FIG. 1. As discussed above, the telematics device 206 may receive vehicle telematics data from vehicle sensors 210, and may transmit the data to one or more external computer systems (e.g., an insurance system 244) over a wireless network. Telematics devices 206 also may be configured to detect or determine additional types of data relating to real-time driving and the condition of the vehicle 204. In certain embodiments, the telematics device 206 may contain or may be integral with one or more of the vehicle sensors 210. The telematics device 206 may also store the type of the vehicle 204, for example, the make, model, trim (or sub-model), year, and/or engine specifications, as well as other information such as vehicle owner or driver information, insurance information, and financing information for the vehicle 204.

In the example shown in FIG. 2, the telematics device 206 may receive vehicle telematics data from vehicle sensors 210, and may transmit the data to a braking event detection system 202. However, in other examples, one or more of the vehicle sensors 210 may be configured to transmit data directly to a braking event detection system 202 without using a telematics device 206. For instance, a telematics device 206 may be configured to receive and transmit data from certain vehicle sensors 210, while other sensors may be configured to directly transmit data to a braking event detection system 202 without using the telematics device 206. Thus, telematics devices 206 may be optional in certain embodiments.

In certain embodiments, the mobile device 212 within the vehicle 204 may be programmed with instructions to collect vehicle telematics data from the telematics device 216 or from the vehicle sensors 210, and then to transmit the vehicle telematics data to the braking event detection system 202 and other external computing devices. For example, the mobile device 212 may transmit the vehicle telematics data directly to a braking event detection system 202, and thus may be used in conjunction with or instead of the telematics device 206. Moreover, the processing components of the mobile device 212 may be used to collect and analyze vehicle telematics data to detect braking events, issue notifications to other vehicles regarding braking events, and perform other related functions. Therefore, in certain embodiments, the mobile device 212 may be used in conjunction with or instead of the braking event detection unit 208.

The vehicle 204 may include a braking event detection unit 208, which may be a separate computing device or may be integrated into one or more other components within the vehicle 204, such as the telematics device 206, the internal computing systems of the vehicle 204, and/or the mobile device 212. In some examples, the mobile device 212 may include a braking event detection unit 230 which may be a device separate and independent from the braking event detection unit 208 of the vehicle 204. The braking event detection units 208 and 230 may alternatively be implemented by computing devices separate and independent from the vehicle 204 and the mobile device 212, such as one or more computer systems 240. In any of these examples, the braking event detection units 208 and 230 may contain some or all of the hardware/software components as the braking event detection system 101 depicted in FIG. 1.

The braking event detection units 208 and 230 may be implemented in hardware and/or software configured to receive raw sensor data from the vehicle sensors 210 and the mobile device sensors 214 respectively, and/or other vehicle telematics data sources. The braking event detection unit 208 may further be configured to receive raw sensor data from a telematics device 206. After receiving the raw sensor data and vehicle telematics data, the braking event detection units 208 and 230 may process the raw data and/or analyze the raw sensor data and vehicle telematics data to determine whether a braking event occurred during a particular window of time. One or more notifications may be generated based on the determination and/or issued to other nearby mobile devices and vehicles. For example, the braking event detection units 208 and 230 may analyze the sensor data collected from the mobile sensors 214 and the vehicle sensors 210. The braking event detection units 208 and 230 may then apply machine learning algorithms to the collected sensor data to determine whether a particular window of time should be classified as a braking event. In examples where a window of time is classified as a braking event, the braking event detection units 208 and 230 may notify nearby vehicles and associated mobile devices regarding the braking event.

Further, in certain implementations, the functionality of the braking event detection units 208 and 230, such as collecting and analyzing sensor data to detect braking events, and issuing notifications to nearby mobile devices and vehicles regarding the braking events, may be performed in a braking event detection system 202 rather than by the individual vehicle 204 or mobile device 212. In such implementations, the vehicle 204 or mobile device 212 may only collect and transmit sensor data to a braking event detection system 202, and thus the braking event detection units 208 and 230 may be optional. Thus, in various examples, the analyses and actions performed within the braking event detection units 208 and 230 may be performed entirely within the braking event detection units 208 and 230, entirely within the braking event detection system 202, or in some combination of the two. For instance, the braking event detection units 208 and 230 may continuously receive and analyze sensor data and determine whether the sensor data indicates a change in acceleration/deceleration is above a predefined threshold. While the changes in acceleration/deceleration are below the predefined threshold (i.e., there is minimal likelihood of a braking event), the braking event detection units 208 and 230 may continue to receive and analyze data, such that large or repetitive amounts of data need not be transmitted to the braking event detection system 202. However, upon detecting a change in acceleration/deceleration above the predefined threshold, the braking event detection units 208 and 230 may transmit the sensor data to the braking event detection system 202, such that the braking event detection system 202 may apply machine learning algorithms to determine whether a braking event has occurred. In these examples, the braking event detection units 208 and 230 may control the type of data and the amount of data transmitted to the braking event detection system 202 for processing.

Detailed descriptions and examples of the analyses that may be performed by the braking event detection units 208 and 230 and/or by the braking event detection system 202 are described below.

Figure 3:
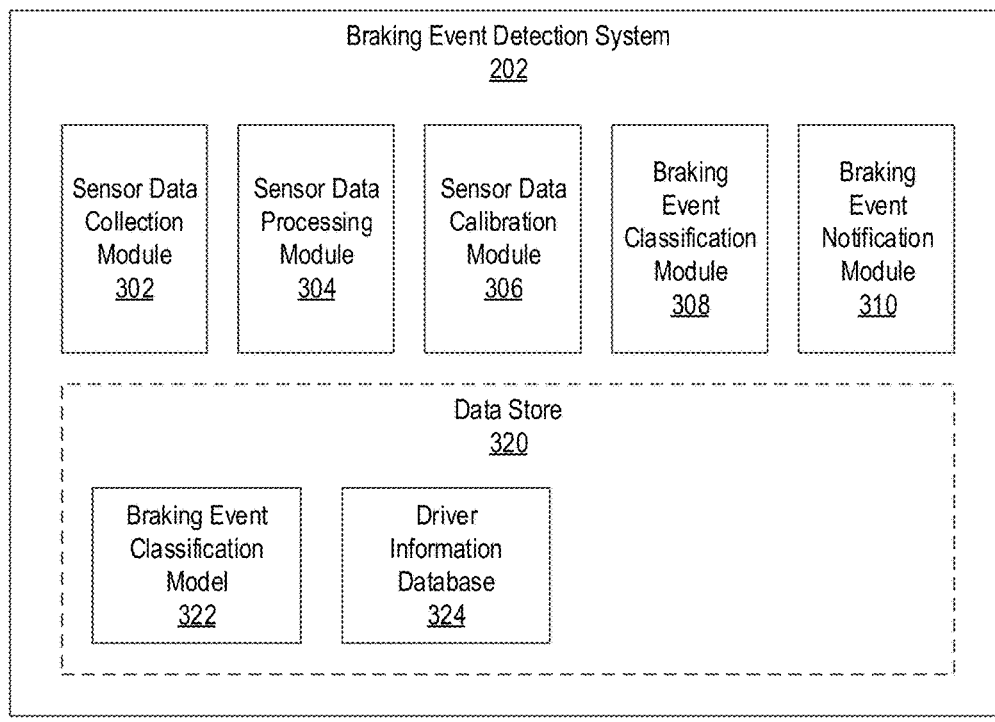
FIG. 3 is a block diagram of an example of an implementation of a braking event detection system, according to one or more aspects of the disclosure.

FIG. 3 shows an example implementation of a braking event detection system 202. In some example implementations, the braking event detection system 202 is a special-purpose computing device programmed with instructions, that when executed, perform functions associated with collecting or receiving raw sensor data from mobile devices and vehicles during a window of time, processing the raw sensor data, determining whether a braking event likely occurred during the window of time, and generating and/or issuing notifications to nearby mobile devices and vehicles where a braking event likely occurred. In these example implementations, the units 302-308 of the braking event detection system 202 correspond to particular sets of instructions embodied as software programs residing at the braking event detection system 202. In other example implementations, the braking event detection system 202 is a collection of special-purpose computing devices that are interconnected and in signal communication with each other. In these examples, each unit or device 302-308 of the braking event detection system 202 respectively corresponds to a special-purpose computing device programmed with a particular set of instructions, that, when executed, perform respective functions associated with collecting sensor data from mobile devices and vehicles during a window of time, processing the sensor data, determining whether a braking event likely occurred during the window of time, and issuing notifications to nearby mobile devices and vehicles where a braking event likely occurred. Such special-purpose computing devices may be, for example, application servers programmed to perform the particular set of functions.

The braking event detection system 202, in this example, includes various modules, units and databases that facilitate collecting and processing raw sensor data during a window of time, determining whether a braking event likely occurred during the window of time, and issuing notifications to nearby mobile devices and vehicles where a braking event likely occurred. It will be appreciated that the braking event detection system 202 illustrated in FIG. 3 is shown by way of example, and that other implementations of a braking event detection system may include additional or alternative modules, units, devices, and/or databases without departing from the scope of the claimed subject matter. In this example, the braking event detection system 202 includes a sensor data collection module 302, a sensor data processing module 304, a sensor data calibration module 306, a braking event classification module 308, a braking event notification module 310, and a data store 320. Each module may include hardware and/or software configured to perform various functions within the braking event detection system 202.

Further, each module may be a separate and distinct computing device or one or more modules may be integrated into a single computing device.

The data store 320 may store information relating to the determination of whether sensor data represents a braking event, information relating to the drivers of the vehicle 204, information relating to the mobile device 212, information relating to nearby vehicles, and information relating to nearby mobile devices. For example, the data store 320 may include a braking event classification model 322, and a driver information database 324. It will be appreciated that in other examples, the data store 320 may include additional and/or alternative database.

In this example, the braking event classification model 322 may store information relating to one or more classification machine learning algorithms, including random forest, k-means clustering, neural network, support vector machine, etc. The classification machine learning algorithms may be used by the braking event detection system 202 to determine whether or not sensor data collected during or representing a particular window of time likely represents a braking event. As such, the classification machine learning algorithms may classify as a window of time into 2 classes: a likely braking event, and an unlikely braking event. A classification machine learning algorithm may be based on various features relating to the sensor data. The features may include sensor data collected from the mobile sensors 214, the vehicle sensors 210, and any other vehicle telematics data. The features may also include data derived by performing statistical calculations (e.g., calculating a maximum value, minimum value, standard deviation, variance, absolute value, mean, median, etc.) or post-processing (e.g., reducing redundancies, reducing noise, etc.) on the sensor data collected from the mobile sensors 214, the vehicle sensors 210, and any other vehicle telematics data. In some examples, the features used by the classification machine learning algorithm may have different levels of importance, such that some features are more indicative of a likely braking event than others. Accordingly, the classification machine learning algorithm may assign various weights to the features.

The driver information database 324 may store information associated with drivers of the vehicles 204 (e.g., name of driver, vehicle identification, one or more associated mobile devices, etc.) and information associated with drivers of nearby vehicles (e.g., name of driver, vehicle identification, one or more associated mobile devices, etc.). In some examples, the driver information database 324 may also store the driver's affiliation with one or more insurance companies.

Figure 4:
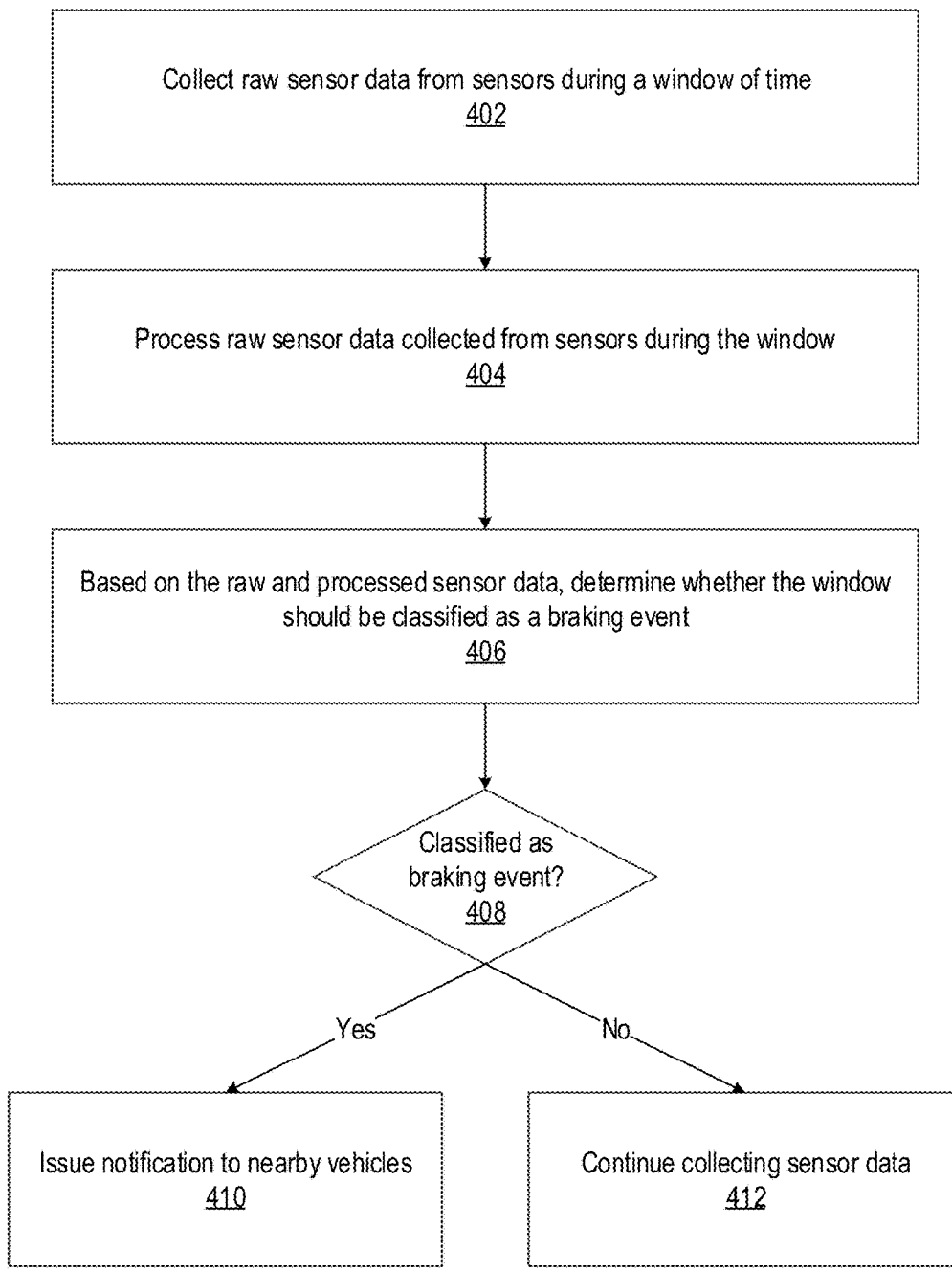
FIG. 4 is a flowchart of example method steps for receiving and analyzing fused sensor data from mobile devices, detecting a braking event, and issuing a notification based on the detection, according to one or more aspects of the disclosure.
Figure 8:
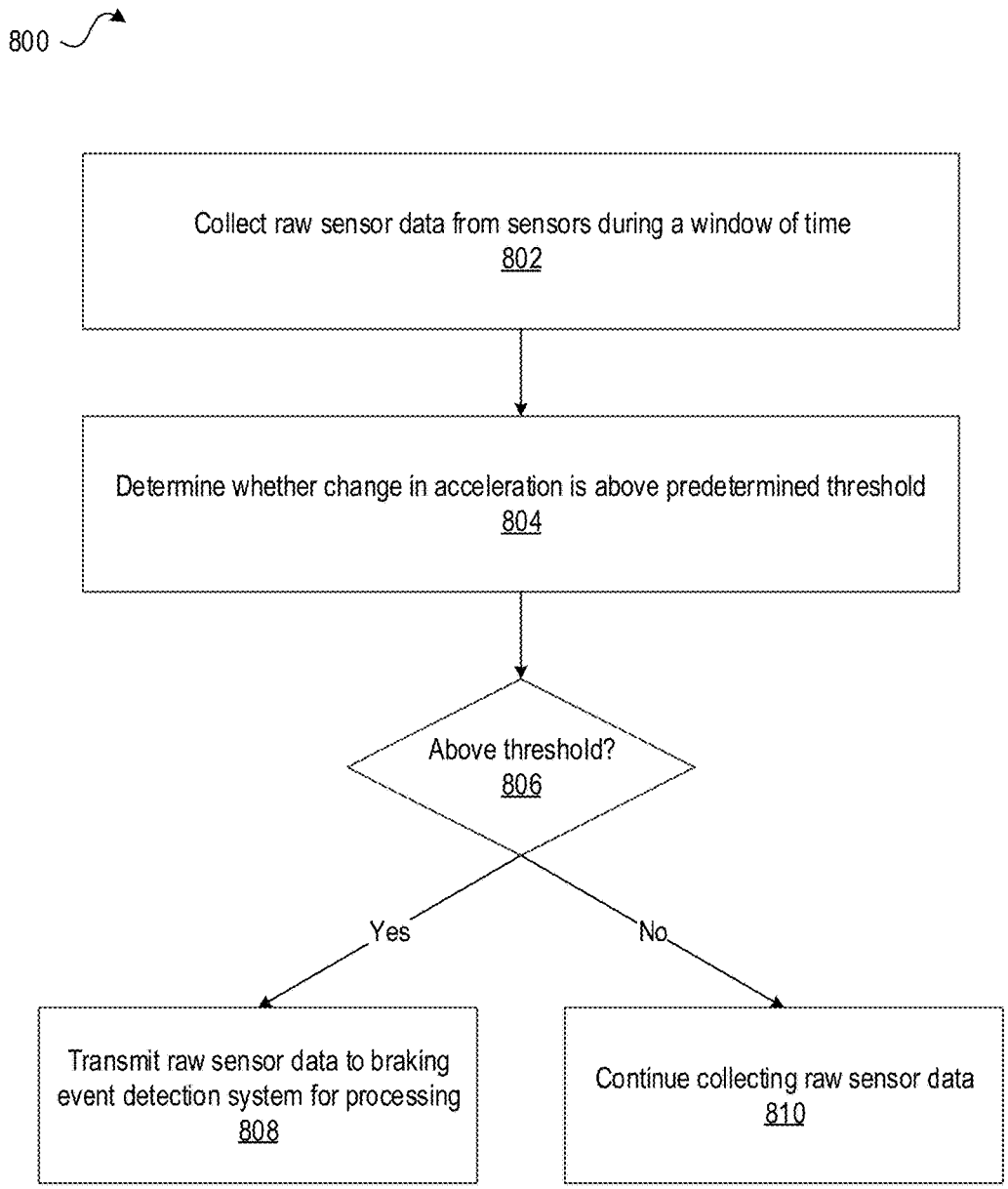
FIG. 8 is a flowchart of example method steps for controlling the data transmitted to a braking event detection system, according to one or more aspects of the disclosure.

FIG. 4 is a flowchart 400 of example steps for determining whether sensor data for a particular window of time likely represents a braking event. The various components of the braking event detection system 202 and/or the braking event detection unit 230 of the mobile device 212 may be used to perform these method steps. In step 402, the sensor data collection module 302 may receive raw sensor data during a window of time (or data from a window of time) from the one or more sensors 214 installed at, attached to, and/or remotely located relative to the mobile device 212. In some examples, the mobile device 212 may collect sensor data from the one or more sensors 214 and transmit the sensor data to the braking event detection system 202 in real-time. As such, the mobile device 212 may broadcast the sensor data to the braking event detection system 202. In other examples, the mobile device 212 may collect the sensor data from the one or more sensors 214, transmit the sensor data to the braking event detection unit 230 in real-time, and the braking event detection unit 230 may transmit the sensor data to the braking event detection system 202. The braking event detection unit 230 may or may not transmit the sensor data to the braking event detection system 202 in real-time. For instance, the braking event detection unit 230 may begin to collect sensor data from the one or more sensors 214 at the start of a window of time, and wait to transmit sensor data from the one or more sensors 214 until the end of the window of time. In another example, the braking event detection unit 230 may collect sensor data and determine where the change in acceleration is above a predefined threshold, as described above. In this example, the braking event detection unit 230 may only transmit the sensor data to the braking event detection system 202 where the change in acceleration is above the predefined threshold. For instance, referring now to FIG. 8, a flowchart 800 of example steps for controlling data transmissions to the braking event detection system 202 is shown. In step 802, the braking event detection unit 230 may collect raw sensor data, including data relating to an acceleration/deceleration of the vehicle 204. In step 804, the braking event detection unit 230 may determine whether the change in acceleration/deceleration is above a predetermined threshold (e.g., greater than 1 m/s$^2$, less than greater than −1 m/s$^2$, greater than 5 m/s$^2$, less than greater than −5 m/s$^2$, etc.). Where the change in acceleration in above the predefined threshold in step 806, the braking event detection unit 230 may transmit the raw sensor data collected during a window of time to the braking event detection system 202 for processing in step 808. Alternatively, where the change in acceleration is not above the predefined threshold in step 806, the braking event detection unit 230 may continue collecting raw sensor data in step 801, electing not to transmit the previously collected raw sensor data to the braking event detection system 202. As such, in these examples, the braking event detection unit 230 advantageously limits and/or controls the number of transmissions between the mobile device 212 and the braking event detection system 202. In yet other examples, the braking event detection unit 230 may transmit sensor data to the braking event detection 202 system in response to a request from the braking event detection system 202 to collect and transmit data during a window of time.

Referring back to FIG. 2, examples of sensor data collected from the sensors 214 of the mobile device 212 may include location from the GPS receiver 216, acceleration from the accelerometer 218, rotational motion from the gyroscope 220, sound from the microphone 222, movement from the camera 224, and magnetization from the magnetometer 226. Examples of sensor data derived from the data collected from the sensors 214 of the mobile device 212 (features) may include minimum acceleration, total acceleration, variance in acceleration, variance in rotational motion, maximum rotational motion, minimum speed, maximum speed, median acceleration, and indicators of whether the minimum acceleration is below a predefined threshold (e.g., 4 mph, 6 mph, etc.). The derived data (or features) may be used by the classification machine learning algorithms to determine whether or not a braking event occurred within a window of time. In some examples, the features may have different levels of importance, such that some features are more indicative of a likely braking event than others.

In some arrangements, the braking event detection system 202 may specify a polling frequency collect raw sensor data from the sensors 214. The polling frequency may control the number of data points requested during a window of time. For instance, a polling frequency of one may request the sensors 214 to collect every data point (e.g., consecutive data points). A polling frequency greater than one may request the sensors to 214 to collect non-consecutive data points. For example, a polling frequency of two may request the sensors 214 to collect every second data point, and a polling frequency of three may request the sensors 214 to collect every third data point.

In some examples, the braking event detection system 202 may advantageously adjust the polling frequency for collecting sensor data from the sensors 214 based on multiple factors. The polling frequency for collecting sensor data adjusts the number of requests to the sensors 214 such that, in some arrangements, the sensors 214 capture non-consecutive data points, rather than consecutive data points, as performed in other arrangements. For instance, the braking event detection system 202 may request the sensors 214 to collect only every second data point, every third data point, etc. In some examples, the sensors 214 may be configured to have an adjustable polling frequency for collecting sensor data. Additionally or alternatively, the mobile device 212, the braking event detection module 202, and/or the braking event detection unit 230 may be configured to collect data from the sensors 214 at the polling frequency calculated by the sensor data collection module 302. In some examples, the braking event detection system 202 may specify more than one polling frequency. For example, the braking event detection system 202 may request the sensors 214 may collect every second data point and every third data point.

By reducing the polling frequency for collecting sensor data, the braking event detection module 202 advantageously reduces the power consumption of devices associated with the method of detecting braking events, and also advantageously increases the accuracy of the sensor data and/or analysis of the sensor data. For example, by collecting every second (or third, etc.) data point from the GPS receiver 216, the braking event detection system 202 may advantageously conserve the mobile device's 212 limited resources (e.g., battery life), since collecting data from the GPS receiver 216 is a power-intensive process. Further, by collecting every second (or third, etc.) data point from the GPS receiver 216, the braking event detection system 202 may also advantageously eliminate noise and/or anomalies in the data stream resulting from constant movement of the mobile device 212 within the vehicle 204. The elimination of noise and/or anomalies in this early step 402 of the method illustrated in FIG. 4 also reduces the amount of post-processing (e.g., filtering, smoothing, etc.) required in later steps 404 of the method. It will be appreciated that the braking event detection system 202 may additionally or alternatively adjust the polling frequency for other sensors 214, including the accelerometer 218, the gyroscope 220, the microphone 222, the camera 224, and the magnetometer 226.

Figure 5:
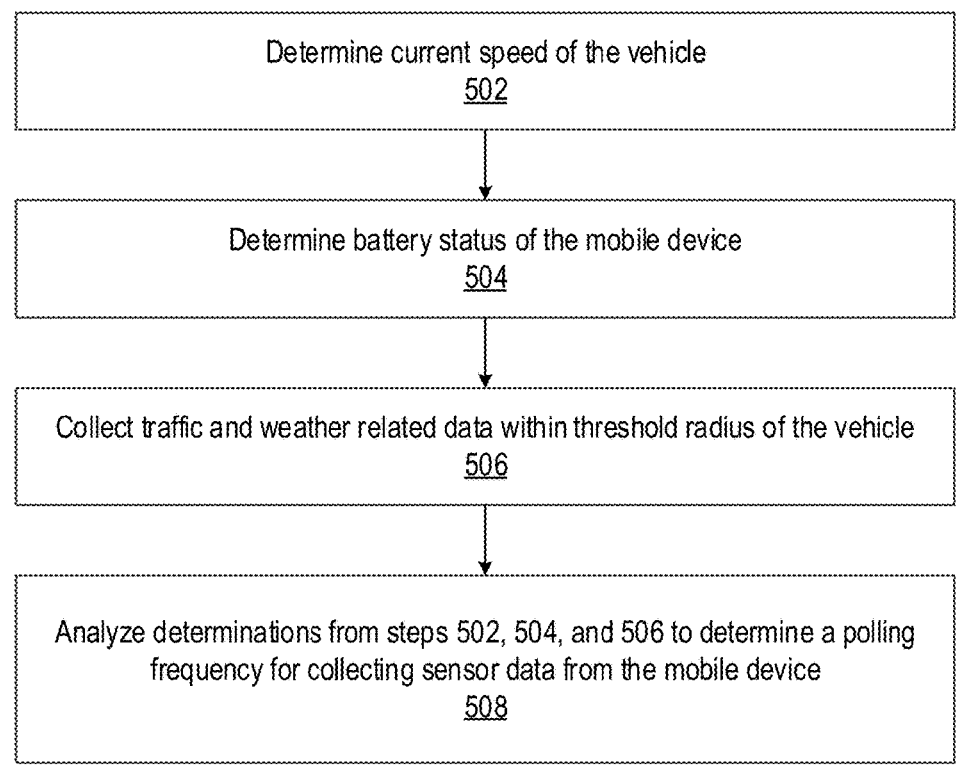
FIG. 5 is a flowchart of example method steps for determining a polling frequency for collecting sensor data from a mobile device, according to one or more aspects of the disclosure.

Referring now to FIG. 5, a flowchart 500 of example method steps for adjusting the polling frequency for collecting sensor data from a mobile device 212 is shown. The sensor data collection module 302 of the braking event detection system 202 and/or of the braking event detection unit 230 may be used to perform these method steps. At step 502, the sensor data collection module 302 may determine a current speed of the vehicle 204. For instance, the sensor data collection module 302 may request the current speed of the vehicle 204 from the mobile device 212, which may in turn request the current speed of the vehicle from the GPS receiver 216. In some examples, the current speed of the vehicle may be an average speed based on multiple requests to the GPS receiver 216 (e.g., an average speed of the vehicle 204 over the last 30 seconds, over the last minute, etc.). At step 504, the sensor data collection module 302 may determine the battery status of the mobile device 212. At step 506, the sensor data collection module 302 may collect traffic and weather related data within a threshold radius of the vehicle 204. In some examples, traffic related data may be collected for a first threshold radius, and weather related data may be collected for a second threshold radius, such that the first threshold radius is smaller than the second threshold radius. As described above, the mobile device 212 may be in signal communication with external traffic databases and external weather databases. Thus, the mobile device 212 may retrieve traffic and weather related data from the external traffic databases and external weather databases based on a location (e.g., coordinate) retrieved from the GPS receiver 216.

At step 508, the sensor data collection module 302 may analyze the determinations from steps 502, 504, and 506 to determine a polling frequency for collecting sensor data from the sensors 214 of the mobile device 212. For example, where the vehicle 204 is travelling at a low speed (e.g., less than 30 mph), the battery status of the mobile device 212 is low, the traffic is normal, and/or the weather is normal, the sensor data collection module 302 may reduce the polling frequency such that only every 3 data points are collected. In another example, where the vehicle 204 is travelling at a high speed (e.g., more than 60 mph), the battery status of the mobile device 212 is high (e.g., above 50% capacity), the traffic is normal, and/or the weather is normal, the sensor data collection module 302 may reduce the polling frequency such that every 2 data points are collected. In yet another example, where the vehicle 204 is travelling at a high speed, the battery status of the mobile device 212 is high, the traffic is heavy, and/or there is rain/snow and/or low visibility, the sensor data collection module 302 may maintain the polling frequency such that every data point is collected. It will be appreciated that additional or alternative factors may be used by the sensor data collection module 302 to determine a polling frequency.

Referring back to FIG. 4, in step 303, the sensor data processing module 304 may process the raw sensor data collected by the sensor data collection module 302. For instance, the sensor data processing module 304 may partition the sensor data into windows of time. The window of time may be a predefined duration of time (e.g., a 5-second window, a 10-second window, etc.) with a start time and an end time. Within a particular window of time, the sensor data processing module 304 may perform a data smoothing algorithm to remove noise and duplicate values. The sensor data processing module 304 may identify a duplicate data point by comparing a first data point with a second data point that immediately follows the first data point. Where the first data point is has the same value and/or is within a predetermined threshold of the second data point (e.g., within 1% of, within 2% of, etc.), the sensor data processing module 304 may flag the second data point as a duplicate data point. Data points flagged as duplicate data points may be removed by the sensor data processing module 304 using the data smoothing algorithm. In some arrangements, this may be performed by replacing the duplicate data point with an average value of the data point immediately before it (i.e., a second data point that immediately precedes the duplicate data point) and the data point immediately after it (i.e., a third data point that immediately follows the duplicate data point). The smoothed data may be used by the classification machine learning algorithms in addition to or instead of the raw and derived sensor described above.

In some examples, the sensor data processing module 304 may generate a new set of sensor data with a further reduced polling frequency. For example, where the sensor data collection module 302 used a polling frequency of every 2 data points to generate the raw sensor data, the sensor data processing module 304 may generate a new set of sensor data using a polling frequency of every 4 data points (of the original data) by using every other data point (of the raw sensor data). The generated set of sensor data with a reduced polling frequency may be used in addition to or instead of the sensor data collected by the sensor data processing module 304. Thus, the braking event detection system 202 may ultimately determine whether a braking event has occurred based on one or more sets of sensor data, where the one or more sets of sensor data may be based on different polling frequencies.

Figure 6:
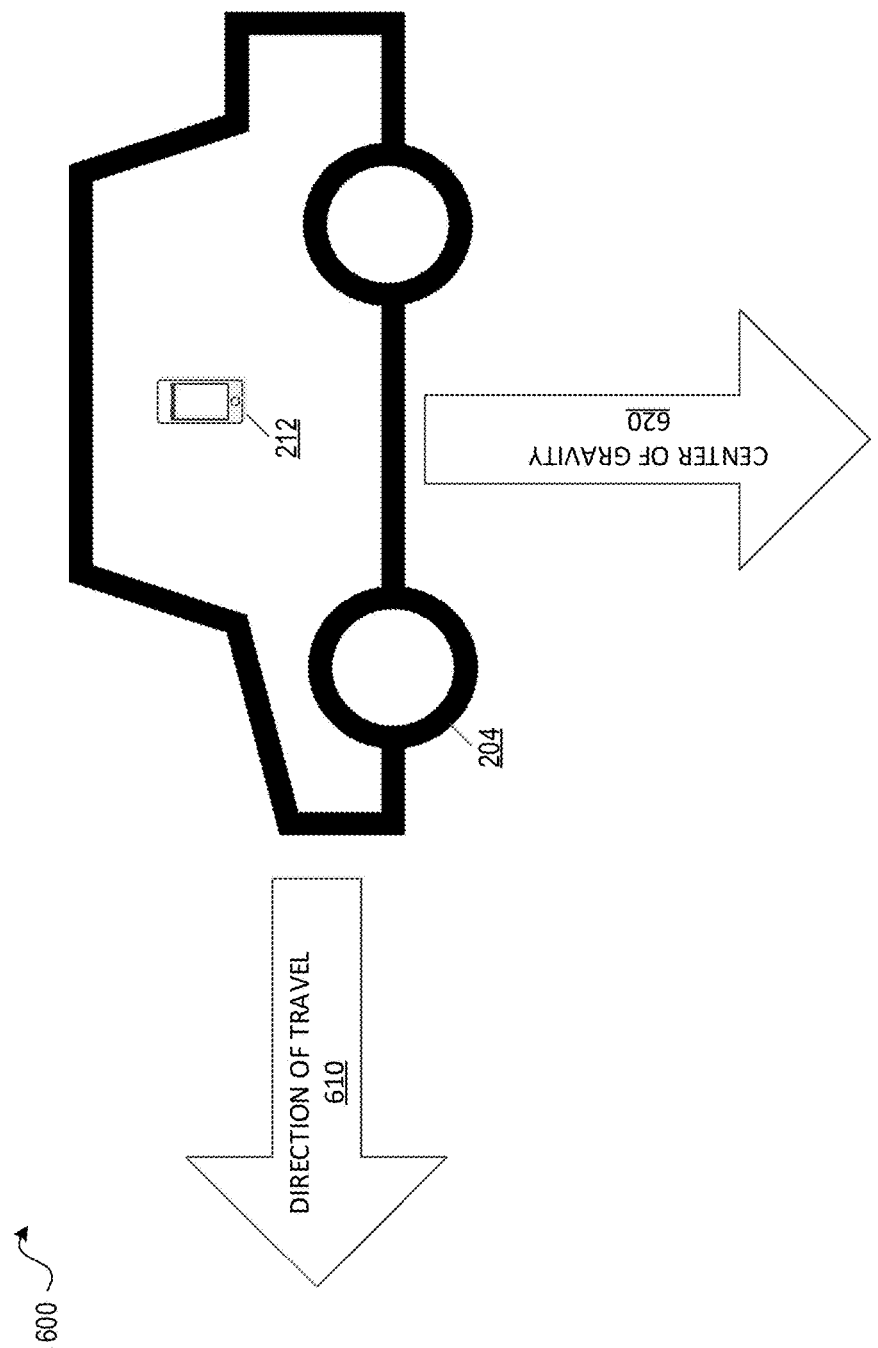
FIG. 6 illustrates various aspects of a vehicle and a mobile device therein used to align sensor data from the mobile device to a reference frame of the vehicle, according to one or more aspects of the disclosure.

Additionally, the sensor data calibration module 306 may perform an alignment of the sensor data based on the axes of the mobile device 212 and the reference frame of the vehicle 204 (i.e., translate the first, second, and third axes of the sensor data into an x-axis, y-axis, and z-axis). In certain embodiments, the sensor data calibration module 306 may perform the alignment based on gravity. In other words, the sensor data calibration module 306 may use gravity to determine an orientation of the mobile device 212 within the vehicle 204. FIG. 6 shows various aspects of a vehicle 204 and a mobile device 212 therein used to align sensor data from the mobile device 212 to a reference frame of the vehicle 204. As shown in FIG. 6, the sensor data calibration module 306 may transform the sensor data such that the z-axis of the sensor data associated with the mobile device 212 is aligned with the direction of gravity 620 (e.g., a vector indicating acceleration due to gravity), and the x-axis of the sensor data associated with the mobile device 212 is aligned with the direction of travel 610. To determine the x-axis based on the sensor data, the sensor data calibration module 306 may determine along which axis the maximum speed and acceleration take place. In particular, the sensor data calibration module 306 may analyze the sensor data to detect large magnitudes of movement (e.g., speed, acceleration, rotational movement, etc.) along an axis, and infer that this axis corresponds to the x-axis of the reference frame of the vehicle 204. In these examples, the y-axis is the remaining axis.

Referring back to FIG. 4, in certain embodiments, in addition to the sensor data obtained from the sensors 214 of the mobile device 212, the braking event detection system 202 may collect and process sensor data from the sensors 210 of the vehicle 204. The sensor data from the sensors 210 of the vehicle 204 may be used to supplement the sensor data from the sensors 214 of the mobile device 212 as desired. The additional data may be beneficial in providing increased certainty in detecting braking events. For example, where the sensor data from the sensors 214 of the mobile device 212 contain too much noise (e.g., due to movement of the mobile device 212 within the vehicle 204), or signal communication with the mobile device 212 is lost, the braking event detection system 202 (and/or the braking event detection unit 208) may collect and process sensor data from the sensors 210 of the vehicle 204. The braking event detection system 202 may implement similar methods to those described above with respect to sensor data obtained from the sensors 214 of the mobile device 212. In these examples, the sensor data from the sensors 210 may also be used to perform an alignment of the sensor data based on the axes of the mobile device 212 instead of relying on the direction of gravity. For instance, the braking event detection system 202 may match axes of the mobile device 212 with the reference frame of the vehicle by comparing similar sensor data values collected from the sensors 210 and the sensors 214. It will be appreciated that other methods known in the art for aligning axes for sensor data collected from a mobile device and a vehicle may be used.

In step 406, the braking event classification module 308 may determine whether a particular window of time should be classified as a braking event, based, at least in part, on fused sensor data. Fused sensor data may include raw data collected from the GPS receiver 216, the accelerometer 218, the gyroscope 220, the microphone 222, the camera 224, and the magnetometer 226, as well as derived data (e.g., statistical computations on the raw data) and processed data (e.g., smoothing algorithms on the raw data and/or the derived data). The braking event classification module 308 may apply the classification machine learning algorithms stored in the braking event classification model 322 to classify a window as either a braking event or not a braking event. As described above, certain features of the fused sensor data may be more indicative of a braking event than others. For example, a smoothed version of minimum acceleration calculated using raw data from the GPS receiver 216, with a polling frequency of every 2 data points may be the most accurate feature in determining whether a window should be classified as a braking event. Other important features may include the minimum acceleration calculated using raw data from the GPS receiver 216 with a polling frequency of every 2 data points, but without the smooth algorithm. It will be appreciated that the order of importance of the various raw data, derived data, and processed data features will be determined based on the classification machine learning algorithms.

A classification of a braking event may indicate that the fused sensor data associated with the window of time is likely a braking event. By contrast, a classification of a non-braking event may indicate that the fused sensor data associated with the window of time is not likely a braking event. In some examples, the braking event classification module 308 may specify a probability threshold (e.g., 50%, 60%, etc.). As such, if, according to the classification machine learning algorithms, the probability of the sensor data associated with the window of time being a braking event is above the probability threshold, the braking event classification module 308 may classify the window of time as a braking event. In contrast, if, according to the classification machine learning algorithms, the probability of the sensor data associated with the window of time being a braking event is below the probability threshold, the braking event classification module 308 may classify the window of time as not a braking event. Thus, the precision and recall of the classification machine learning algorithms may be controlled by configuring the braking event classification module 308 to have a probability threshold. A higher probability threshold translates to greater precision and lower recall, whereas a lower probability threshold translates to lower precision and greater recall.

Figure 7A:
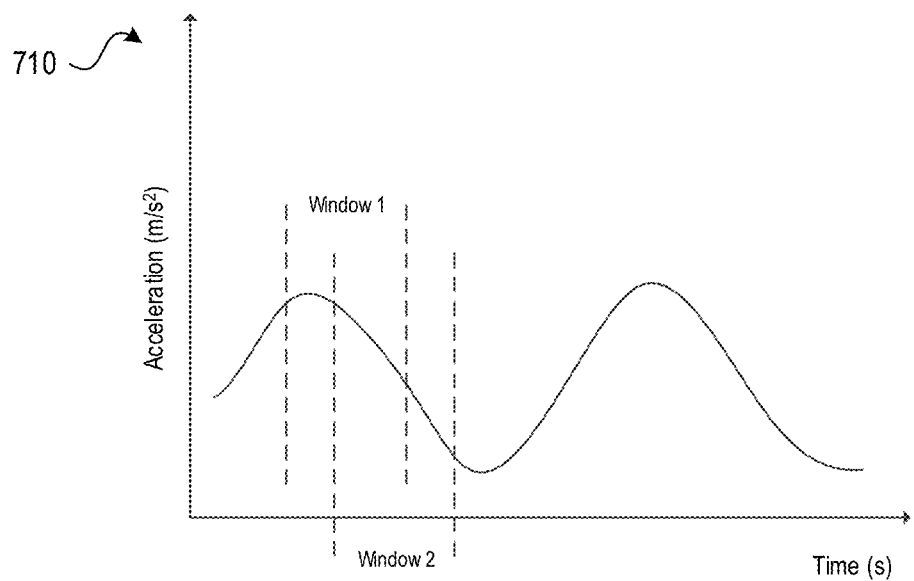
FIG. 7A illustrates a sliding window approach to detecting brake events, according to one or more aspects of the disclosure.
Figure 7B:
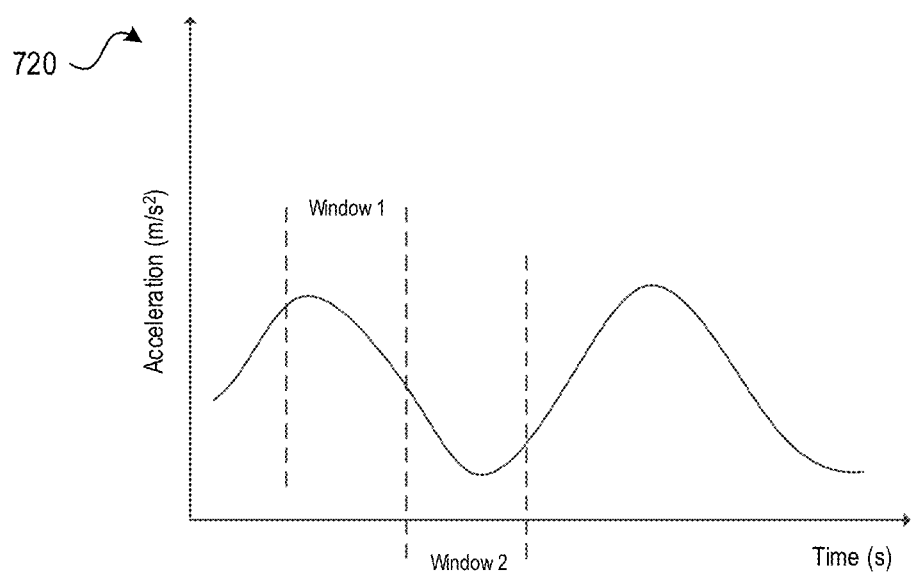
FIG. 7B illustrates a consecutive window approach to detecting brake events, according to one or more aspects of the disclosure.

If a window is classified as a non-braking event 408, the braking event detection system 202 may continue collecting sensor data in step 412 for a different window of time. As such, the method steps 402-408 provided in FIG. 4 may be repeated for different windows of time. For instance, the method steps may repeated using a sliding window algorithm, such that consecutive windows are overlapping and shifted by one data point, as shown in graph 710 FIG. 7A. Additionally or alternatively, the method steps may be repeated for consecutive windows such that there is no overlap, as shown in graph 720 in FIG. 7B.

Referring back to FIG. 4, if a window is classified as a braking event 408, the braking event notification module 310 may generate and/or issue a notification (e.g., a visual notification, an audio notification, etc.) to nearby mobile devices and/or nearby vehicles regarding the braking event in step 410. A nearby mobile device may be a second mobile device that is within a predetermined distance (e.g., 5 feet, 10 feet, 50 feet, 100 feet, etc.) of the mobile device 212. A nearby ve3hicle may be a second vehicle that is within a predetermined distance (e.g., 5 feet, 10 feet, 50 feet, 100 feet, etc.) of the vehicle 204. In some examples, the braking event notification module 310 may broadcast a notification of the braking event on a publicly-accessible server, such that nearby mobile devices and/or nearby vehicles may periodically poll the server for likely braking events. Accordingly, the notification on the server may be associated with a GPS coordinate of the vehicle 204. In other examples, the braking event notification module 310 may notify nearby mobile devices and/or nearby vehicles using short-range communication protocols, such as WLAN, Bluetooth, CALM, or via short-range vehicle communication systems. The notification may include displaying a message on a display on the nearby mobile devices and/or the nearby vehicles. Additionally or alternatively, the notification may include emitting a sound on the nearby mobile devices and/or the nearby vehicles. In these examples, the notification may also include the probability of the sensor data associated with the window of time being a braking event, as calculated by the braking event classification module 308.

In some examples, the classification machine learning algorithms may also classify whether a window of time indicates a hard braking event (e.g., sudden acceleration/deceleration). In such examples, the notification issued to nearby mobile devices and/or nearby vehicles may be altered to indicate urgency (e.g., larger display, louder sound, using both visual and audio notifications, etc.). Further, in case of hard braking, the braking event notification module 310 may also issue a notification to an insurance system 240 indicating the vehicle's 204 speed, acceleration, distance from other vehicles, and any other indications of hard braking. A vehicle or driver's insurance information may be retrieved from the driver information database 324.

The method steps provided in FIG. 4 may be repeated for different windows of time. For instance, the method steps may repeated using a sliding window algorithm, such that consecutive windows are overlapping and shifted by one data point, as shown in graph 710 FIG. 7A. Additionally or alternatively, the method steps may be repeated for consecutive windows such that there is no overlap, as shown in graph 720 in FIG. 7B.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A system comprising:
one or more processors; and
memory storing computer-readable instructions that, when executed by the one or more processors, cause the system to:
collect, by a sensor data collection device of the system, sensor data from sensors associated with a computing device within a vehicle during a first window of time and using a polling frequency, wherein the sensor data comprises information relating to at least a location, a speed, and an acceleration of the vehicle;
process, by a sensor data processing device of the system, the sensor data, wherein processing comprises removing one or more duplicate data points from the sensor data and generating processed sensor data;
determine, by a braking event classification device of the system and based on the sensor data and the processed sensor data, to classify a second window of time as a braking event; and
generate and transmit, by a braking event notification device of the system, a notification relating to the braking event of the vehicle to at least one of: a second computing device within a first predetermined distance of the vehicle or a second vehicle within a second predetermined distance of the vehicle.

2. The system of claim 1, wherein processing the sensor data further comprises:
replacing, for each respective duplicate data point of the one or more duplicate data points, the respective duplicate data point with an average value of a first data point and a second data point, wherein the first data point immediately precedes the respective duplicate data point, and wherein the second data point immediately follows the respective duplicate data point.

3. The system of claim 1, further including instructions that, when executed by the one or more processors, cause the system to:
perform, by a sensor data calibration device of the system, an alignment of a first axis, a second axis, and a third axis of the sensor data with an x-axis, a y-axis, and a z-axis of a reference frame of the vehicle.

4. The system of claim 1, further including instructions that, when executed by the one or more processors, cause the system to:
collect, by the sensor data collection device, supplemental sensor data from sensors associated with the vehicle during the first window of time; and
process, by the sensor data processing device, the supplemental sensor data, wherein processing the supplemental sensor data comprises removing duplicate data points and generating processed supplemental sensor data, and wherein determining to classify the second window of time as the braking event is further based on the processed supplemental sensor data.

5. The system of claim 1, further including instructions that, when executed by the one or more processors, cause the system to:
apply, by the braking event classification device and based on the sensor data and the processed sensor data, a classification machine learning algorithm to determine a probability that the second window of time relates to the braking event, wherein determining to classify the second window of time as the braking event is further based on determining that the probability meets a threshold.

6. The system of claim 1, wherein the notification is transmitted via a short-range communication protocol.

7. The system of claim 1, wherein determining to classify the second window of time as the braking event is further based on a random forest machine learning algorithm.

8. A method comprising:
collecting, by a sensor data collecting device of a system, sensor data from sensors associated with a computing device within a vehicle during a first window of time and using a polling frequency, wherein the sensor data comprises information relating to at least a location, a speed, and an acceleration of the vehicle;
processing, by a sensor data processing device of the system, the sensor data, wherein processing comprises removing duplicate data points and generating processed sensor data;
determining, by a braking event classification device of the system and based on the sensor data and processed sensor data, to classify a second window of time as a braking event; and
generating and transmitting, by a braking event notification device of the system, a notification relating to the braking event of the vehicle to at least one of: a second computing device within a first predetermined distance of the vehicle and a second vehicle within a second predetermined distance of the vehicle.

9. The method of claim 8, further comprising:
replacing, for each respective duplicate data point of the one or more duplicate data points, the respective duplicate data point with an average value of a first data point and a second data point, wherein the first data point immediately precedes the respective duplicate data point, and wherein the second data point immediately follows the respective duplicate data point.

10. The method of claim 8, further comprising:
performing an alignment of a first axis, a second axis, and a third axis of the sensor data with an x-axis, a y-axis, and a z-axis of a reference frame of the vehicle.

11. The method of claim 8, further comprising:
collecting, by the sensor data collection device, supplemental sensor data from sensors associated with the vehicle during the first window of time; and
processing, by the sensor data processing device, the supplemental sensor data, wherein processing the supplemental sensor data comprises removing duplicate data points and generating processed supplemental sensor data, and wherein determining to classify the second window of time as the braking event is further based on the processed supplemental sensor data.

12. The method of claim 8, further comprising:
applying, by the braking event classification device and based on the sensor data and processed sensor data, a classification machine learning algorithm to determine a probability that the second window of time relates to the braking event, wherein determining to classify the second window of time as the braking event is further based on determining that the probability meets a threshold.

13. The method of claim 8, wherein the notification is transmitted via a short-range communication protocol.

14. The method of claim 8, wherein determining to classify the second window of time as the braking event is further based on a classification machine learning algorithm.

15. A computer-assisted method of detecting braking events comprising:
collecting, by a sensor data collecting device of a system, sensor data from sensors associated with a computing device within a vehicle during a first window of time and using a polling frequency, wherein the sensor data comprises information relating to at least a location, a speed, and an acceleration of the vehicle;
processing, by a sensor data processing device of the system, the sensor data, wherein processing comprises replacing duplicate data points with one or more average data points, and wherein the one or more average data points are based on one or more values of data points near the duplicate data points;
determining, by a braking event classification device and based on the sensor data and processed sensor data, to classify a second window of time as a braking event; and
generating and transmitting, by a braking event notification device of the system, a visual notification to at least one of: a second computing device within a first predetermined distance of the vehicle and a second vehicle within a second predetermined distance of the vehicle relating to the braking event of the vehicle.

16. The computer-assisted method of claim 15, further comprising:
performing an alignment of a first axis, a second axis, and a third axis of the sensor data with an x-axis, a y-axis, and a z-axis of a reference frame of the vehicle.

17. The computer-assisted method of claim 15, further comprising:
collecting, by the sensor data collecting device, supplemental sensor data from sensors associated with the vehicle during the first window of time; and
processing, by the sensor data processing device, the supplemental sensor data, wherein processing the supplemental sensor data comprises removing duplicate data points and generating processed supplemental sensor data, and wherein determining to classify the second window of time as the braking event is further based on the processed supplemental sensor data.

18. The computer-assisted method of claim 15, further comprising:
applying, by the braking event classification device and based on the sensor data and processed sensor data, a classification machine learning algorithm to determine a probability that the sensor data associated with the second window of time is the braking event, wherein determining to classify the second window of time as the braking event is further based on determining that the probability meets a threshold.

19. The computer-assisted method of claim 15, further comprising:
using short-range communication protocols to send the visual notification to nearby vehicles.

20. The computer-assisted method of claim 15, wherein determining to classify the second window of time as the braking event is further based on a classification machine learning algorithm.

* * * * *